(12) United States Patent
Morris et al.

(10) Patent No.: US 12,353,225 B2
(45) Date of Patent: Jul. 8, 2025

(54) TEMPERATURE CONTROL DEVICE

(71) Applicant: AUSTRALIAN VALVE GROUP PTY LTD, Kewdale (AU)

(72) Inventors: Peter John Morris, Canning Vale (AU); Leslie Parr, Kelmscott (AU)

(73) Assignee: AUSTRALIAN VALVE GROUP PTY LTD, Kewdale (AU)

( * ) Notice: Subject to any disclaimer, the term of this patent is extended or adjusted under 35 U.S.C. 154(b) by 239 days.

(21) Appl. No.: 17/762,309

(22) PCT Filed: Sep. 28, 2020

(86) PCT No.: PCT/AU2020/051035
§ 371 (c)(1),
(2) Date: Mar. 21, 2022

(87) PCT Pub. No.: WO2021/056082
PCT Pub. Date: Apr. 1, 2021

(65) Prior Publication Data
US 2022/0357756 A1    Nov. 10, 2022

(30) Foreign Application Priority Data
Sep. 27, 2019 (AU) ................................. 2019903644

(51) Int. Cl.
*G05D 23/13* (2006.01)
*F16K 11/04* (2006.01)
(Continued)

(52) U.S. Cl.
CPC .......... *G05D 23/1346* (2013.01); *F16K 11/04* (2013.01); *F16K 31/002* (2013.01);
(Continued)

(58) Field of Classification Search
CPC .......... G05D 23/1346; G05D 23/1326; G05D 23/134; F16K 11/04; F16K 31/002;
(Continued)

(56) References Cited

U.S. PATENT DOCUMENTS 1,991,863 A    2/1935  Morrow
2,419,630 A *  4/1947  Cruzan ................ G05D 23/022
                                              236/92 R
(Continued)

FOREIGN PATENT DOCUMENTS

AU    2017200743    8/2017
EP    1219906       7/2002

OTHER PUBLICATIONS

International Search Report and Written Opinion from parent application PCT/AU2020/051035 mailed Nov. 26, 2020.
(Continued)

*Primary Examiner* — Craig M Schneider
*Assistant Examiner* — Christopher D Ballman
(74) *Attorney, Agent, or Firm* — Grossman, Tucker, Perreault & Pfleger, PLLC

(57) ABSTRACT

Temperature control device (1) has a hot water inlet (12), a cold water inlet (14) and an outlet (16) for tempered water. A diffuser (18) is provided in the device (1) to disrupt the flow of hot water after it enters the device (1). The disrupted hot water emerges from the diffuser (18) into a chamber (20) in which it is melded with cold water that is able to enter the chamber (20) from the inlet (14) when a piston (22) is spaced from a seat (24). The melded hot and cold water result in tempered water that is discharged from the outlet (16). A temperature sensitive device (26) is provided, which is responsive to changes in ambient temperature. A temperature setting mechanism (52) is provided which is operatively associated with the temperature sensitive device (26) and
(Continued)

permits the maximum temperature of the discharged tempered water to be adjusted.

19 Claims, 9 Drawing Sheets

(51) Int. Cl.
| | | |
|---|---|---|
| *F16K 31/00* | (2006.01) | |
| *F16K 47/08* | (2006.01) | |
| *F24D 19/10* | (2006.01) | |
| *F16L 19/04* | (2006.01) | |
| *F16L 55/027* | (2006.01) | |
| *G01K 5/56* | (2006.01) | |
| *G01K 13/02* | (2021.01) | |

(52) U.S. Cl.
CPC .......... *F16K 47/08* (2013.01); *F24D 19/1051* (2013.01); *G05D 23/1326* (2013.01); *F16L 19/041* (2013.01); *F16L 55/02718* (2013.01); *F24D 2220/0235* (2013.01); *F24D 2220/0257* (2013.01); *G01K 5/56* (2013.01); *G01K 13/026* (2021.01); *G05D 23/134* (2013.01)

(58) Field of Classification Search
CPC ................ F16K 47/08; F24D 19/1051; F24D 2220/0235; F24D 2220/0257; G01K 13/026; G01K 5/56; F16L 55/02718; F16L 19/041
See application file for complete search history.

(56) References Cited

U.S. PATENT DOCUMENTS

| | | | | |
|---|---|---|---|---|
| 4,541,448 | A * | 9/1985 | Kolze | F16K 17/38 60/527 |
| 5,148,976 | A * | 9/1992 | Reid | F16K 11/044 236/12.2 |
| 5,779,139 | A * | 7/1998 | Ueno | G05D 23/1346 236/12.22 |
| 5,984,142 | A | 11/1999 | Castaldi | |
| 6,042,015 | A * | 3/2000 | Eveleigh | G05D 23/134 236/12.14 |
| 6,079,625 | A * | 6/2000 | Lebkuchner | G05D 23/1346 236/12.2 |
| 6,250,559 | B1 * | 6/2001 | Knauss | G05D 23/1346 236/12.2 |
| 6,575,377 | B1 * | 6/2003 | Graves | G05D 23/136 236/12.2 |
| 7,744,007 | B2 * | 6/2010 | Beagen | G05D 23/134 236/12.12 |
| 2006/0090798 | A1 | 5/2006 | Beagen et al. | |
| 2010/0032594 | A1 * | 2/2010 | Lamb | F16K 31/002 251/11 |
| 2010/0123015 | A1 | 5/2010 | Beagen | |

OTHER PUBLICATIONS

International Preliminary Report on Patentablity from parent application PCT/AU2020/051035 mailed Aug. 24, 2021.

* cited by examiner

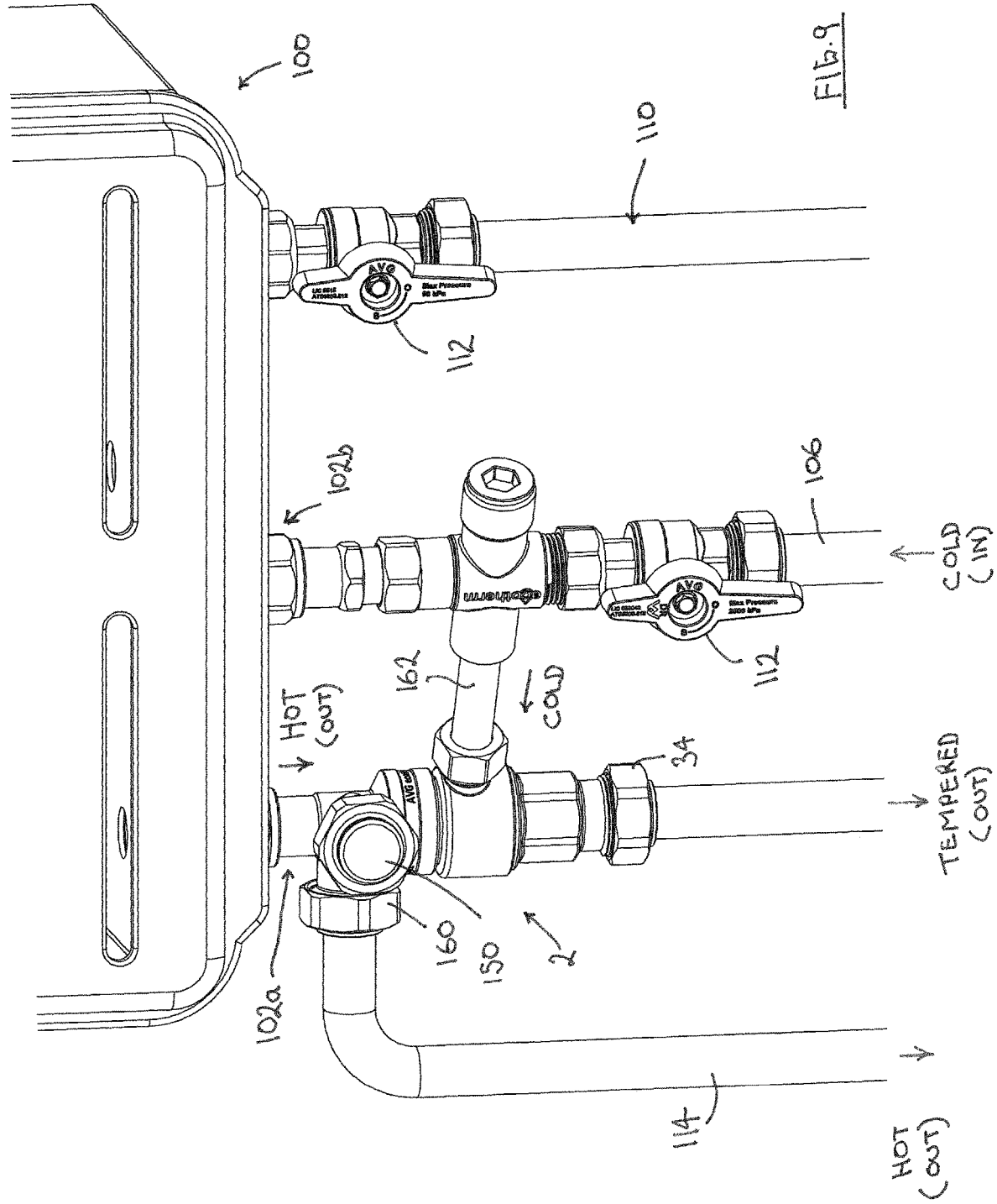

TEMPERATURE CONTROL DEVICE

Throughout this specification, unless the context requires otherwise, the word "comprise" and variations such as "comprises", "comprising" and "comprised" are to be understood to imply the presence of a stated integer or group of integers but not the exclusion of any other integer or group of integers.

Throughout this specification, unless the context requires otherwise, the word "include" and variations such as "includes", "including" and "included" are to be understood to imply the presence of a stated integer or group of integers but not the exclusion of any other integer or group of integers.

TECHNICAL FIELD

The present invention relates to a temperature control device.

BACKGROUND ART

Any discussion of background art, any reference to a document and any reference to information that is known, which is contained in this specification, is provided only for the purpose of facilitating an understanding of the background to the present invention, and is not an acknowledgement or admission that any of that material forms part of the common general knowledge in Australia or any other country as at the priority date of the application in relation to which this specification has been filed.

A hot water system is used to heat water, which may then be delivered on-demand to one or more locations in a building, such a dwelling or commercial premises. Typically, in a dwelling, the locations are in the kitchen, bathroom and laundry. The hot water system, for example, may be gas, electric or solar powered and may be an instantaneous or storage unit depending upon the means by which it heats the water. The hot water system receives a supply of cold water, which is heated by the hot water system. The heated water may then be delivered to the one or more locations in a building as herein before described.

However, in some situations the temperature to which the hot water system heats the water is too high for some locations in a building. For example, in hospitals, schools, hotels, residences, etc. it may be necessary, or a requirement, that the temperature of the water delivered at some locations is less than the temperature to which the hot water system heats the water. For example, in domestic situations at locations where hot water is required for bathing, there may be a requirement that the temperature of the water should not exceed 50° C.; in situations where a duty of care is required (e.g. in hospitals), the maximum permitted temperature of the water may be lower, e.g. the temperature of the water should not exceed 45° C.

In such situations, to reduce the temperature of the water that is delivered, cold water is added to the hot water to temper the hot water (i.e. to reduce the water temperature) resulting in what is often referred to as tempered water. This tempered water is then delivered to those locations that require the heated water to be at a lower temperature than the temperature to which the hot water system heats the water.

Various devices have been used to produce tempered water for situations in which tempered water is required, e.g. thermostatic mixing valves. Combining hot and cold water with equal pressures to produce tempered water in such devices can be difficult, and one or the other can become the dominant stream of water. The dominant stream can inhibit ingress of the other stream such that the dominant stream has an excessive influence on the temperature of the combined hot and cold water streams (i.e. the tempered water) which can result in the temperature of the combined hot and cold water being too hot or too cold.

SUMMARY OF INVENTION

In accordance with one aspect of the present invention there is provided a temperature control device comprising
  a body having a first inlet for hot water, a second inlet for cold water and an outlet,
  a diffuser to disrupt the flow of hot water after it enters the body via the first inlet, the diffuser being located upstream of the second inlet,
  a chamber to receive the hot water, after it has passed through the diffuser, and the cold water,
  a piston movable in the body between a first position and a second position,
  a seat in the body against which the piston seats in the first position and from which the piston is spaced in the second position, the cold water able to enter the chamber when the piston is spaced from the seat, and
  a temperature sensitive device responsive to changes in the ambient temperature,
  wherein, in use, the disrupted hot water and the cold water are melded together in the chamber resulting in tempered water which is discharged from the outlet, and wherein when the ambient temperature of the water around the temperature sensitive device increases to a preset temperature level, the piston is at the second position.

A portion of the chamber may be located upstream of the seat such that, in use, hot water emerges from the diffuser into the portion of the chamber and cold water flows into the hot water emerging into the portion of the chamber and the hot water and cold water are melded together in the chamber resulting in tempered water.

The diffuser may comprise a disc, or plate, having openings therethrough.

The temperature sensitive device may be provided with a pin and a temperature sensitive material that is able to expand and contract with changes in the ambient temperature, and wherein expansion of the temperature sensitive material causes the pin to move in a first or second direction.

The temperature control device may further comprise a temperature setting mechanism. The temperature setting mechanism permits adjustment of (i.e. can be used to adjust and thereby set) the preset temperature level (i.e. preset level of temperature).

The temperature setting mechanism is operatively associated with the temperature sensitive device.

The temperature setting mechanism may include a movable pin member that is movable, in respective first and second directions, closer to or away from the pin of the temperature setting mechanism to thereby adjust the preset temperature level. The first and second directions, in which the movable pin member is movable, are linear directions.

The movable pin member is accommodated by the diffuser.

The movable pin member extends through a central opening in the diffuser.

In a first embodiment, the temperature setting mechanism permits adjustment of the preset temperature level prior to the temperature control device being installed in a plumbing installation, such as a hot water system. This is referred to as pre-installation adjustment of the preset temperature level.

In the first embodiment, the temperature setting mechanism is accessible from outside the temperature control device only when the temperature control device is not installed in a plumbing installation.

In the first embodiment, the temperature setting mechanism is accessible via the first inlet.

In the first embodiment, the movable pin member has a screw thread that engages with a screw thread in the diffuser, such that turning the movable pin member moves the movable pin member in the first or second direction.

In a second embodiment, the temperature setting mechanism permits adjustment of the preset temperature level both prior to and after the temperature control device being installed in a plumbing installation, such as a hot water system. This is referred to as, respectively, pre-installation adjustment and post-installation of the preset temperature level.

In the second embodiment, the temperature setting mechanism is accessible from outside the temperature control device both when the temperature control device is not installed in a plumbing installation and when the temperature control device is installed in a plumbing installation.

In the second embodiment, the temperature setting mechanism is accessible via an offset portion of the body of the temperature control device.

In the second embodiment, the temperature setting mechanism further includes an actuator that is engageable with the movable pin member, such that turning the actuator moves the movable pin member in the first or second direction.

When the piston is at the second position, the temperature of the water discharged from the outlet is at its maximum temperature for the preset temperature level.

In accordance with another aspect of the present invention, there is provided a method of installing a temperature control device as herein before described in a hot water system comprising connecting the hot water outlet of the hot water system with the first inlet of the temperature control device, such that the hot water outlet of the hot water system and the first inlet of the temperature control device are in fluid communication, connecting the outlet of the temperature control device with a delivery conduit for delivering water exiting from the outlet of the temperature control device to one or more locations, such that the outlet of the temperature control device is in fluid communication with the delivery conduit, and connecting the second inlet of the temperature control device with a cold water delivery conduit via a bypass conduit such that the second inlet of the temperature control device and the cold water delivery conduit are in fluid communication via the bypass conduit, the cold water delivery conduit arranged to deliver cold water to the hot water system to be heated.

In accordance with another aspect of the present invention, there is provided a hot water system comprising a water inlet and a water outlet, a temperature control device as herein before described, the water inlet arranged to be connected in fluid communication with a first water delivery conduit to deliver water to the hot water system to be heated, the water outlet arranged to be connected in fluid communication with the first inlet of the temperature control device, the outlet of the temperature control device arranged to be connected in fluid communication with a second water delivery conduit for delivering water exiting from the outlet of the temperature control device to one or more locations, and a bypass conduit to place the second inlet of the temperature control device in fluid communication with the first water delivery conduit such that water from the first water delivery conduit is able to flow through the bypass conduit to the second inlet of the temperature control device.

In accordance with another aspect of the present invention, there is provided a temperature control device comprising a body having a first inlet for hot water, a second inlet for cold water and an outlet, a chamber to receive the hot water, after it has passed through the diffuser, and the cold water, a piston movable in the body between a first position and a second position, a single seat in the body against which the piston seats in the first position and from which the piston is spaced in the second position, the cold water able to enter the chamber when the piston is spaced from the seat, wherein movement of the piston controls only the flow of cold water into the chamber but the flow of hot water into the chamber remains constant despite movement of the piston between the first position and the second position, and a temperature sensitive device responsive to changes in the ambient temperature, wherein, in use, the hot water and the cold water are melded together in the chamber resulting in tempered water which is discharged from the outlet, and wherein when the ambient temperature of the water around the temperature sensitive device increases to a preset temperature level, the piston is at the second position.

The temperature control device may further comprise a diffuser to disrupt the flow of hot water after it enters the body via the first inlet, the diffuser located upstream of the single valve seat.

The expression "cold water" as used herein refers to water at ambient temperature.

BRIEF DESCRIPTION OF DRAWINGS

The present invention will now be described, by way of example only, with reference to the accompanying drawings, in which:

FIG. 9 shows the temperature control device, shown in FIG. 7, connected with a hot water system in a fourth installation.

DESCRIPTION OF EMBODIMENTS

Figure 1:
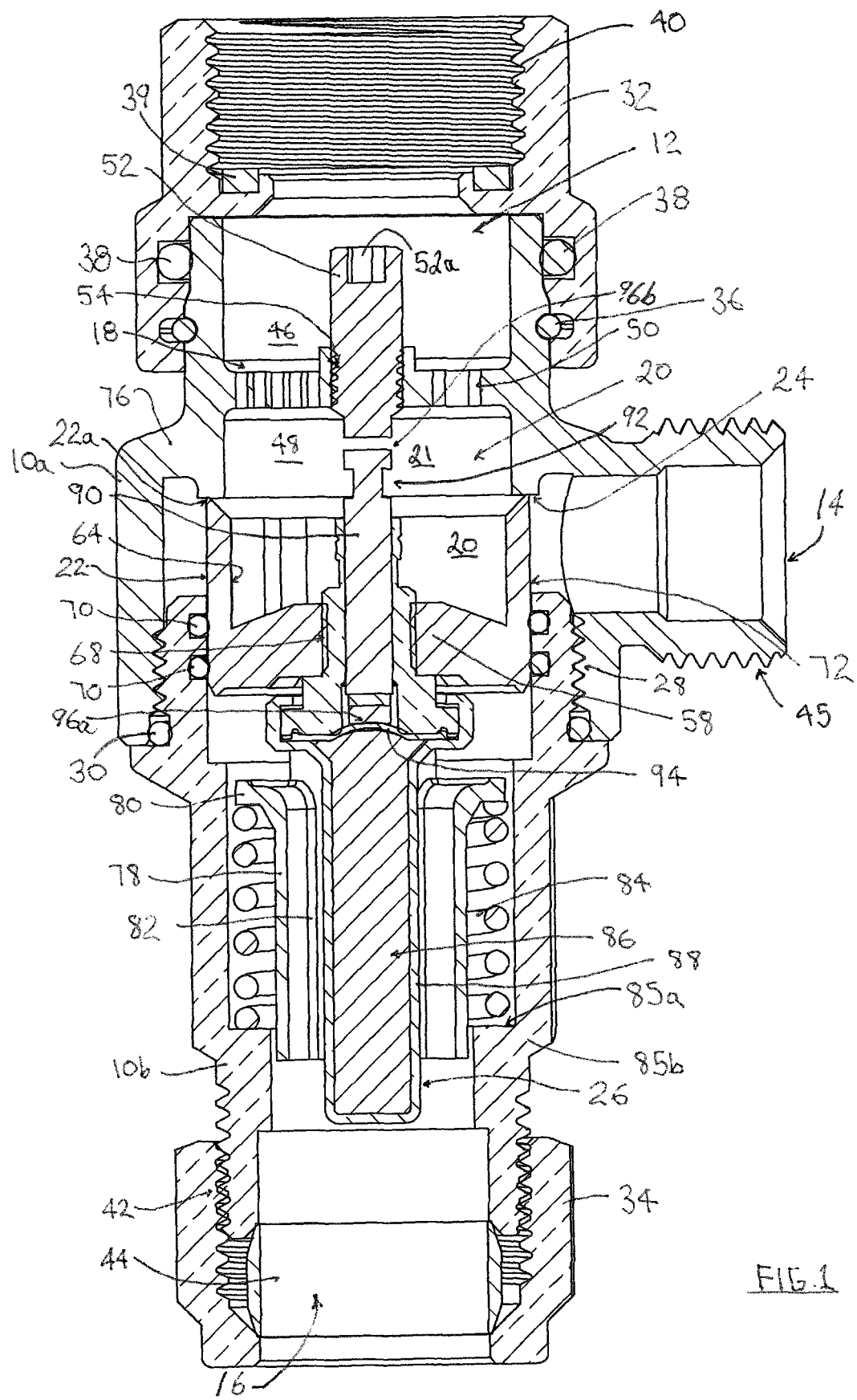
FIG. 1 is a first cross sectional view of a first embodiment of a temperature control device in accordance with an aspect of the present invention.

The same reference numerals are used to denote the same or equivalent parts in the embodiments described herein. Such parts that are described with reference to one or more embodiments are not again described in detail with reference to the other embodiments described herein. It is to be understood that the description of such parts and their use and operation with reference to such one or more embodiment/s also applies to the other embodiment/s. In addition, different reference numerals are used to identify analogous or counterparts in different embodiments. It is to be understood that the description of such parts and their use and operation with reference to one or more embodiment/s also applies to the other embodiment/s.

The first embodiment of the temperature control device described herein has a temperature setting mechanism that permits adjustment of the preset temperature level prior to the temperature control device being installed in a plumbing installation, such as a hot water system. Once the temperature control device has been installed in the plumbing installation, the preset temperature level cannot be adjusted without first uninstalling the temperature control device from the plumbing installation.

The second embodiment of the temperature control device described herein has a temperature setting mechanism that permits adjustment of the preset temperature level both prior to and after the temperature control device being installed in a plumbing installation, such as a hot water system.

The most suitable embodiment of the temperature control device may be selected for the particular plumbing installation into which it is to be installed.

Figure 2:
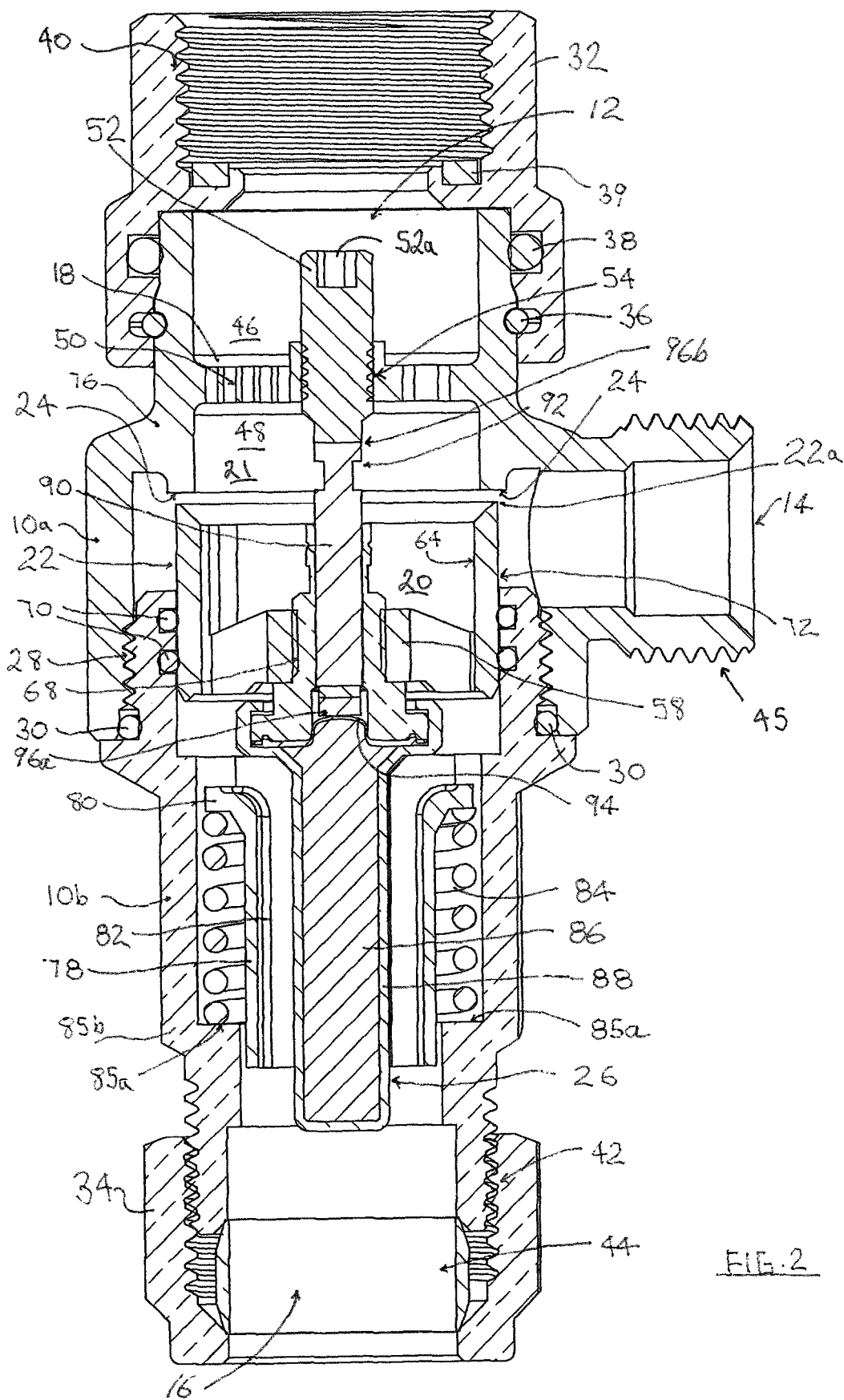
FIG. 2 is a second cross sectional view of the temperature control device shown in FIG. 1.
Figure 3:
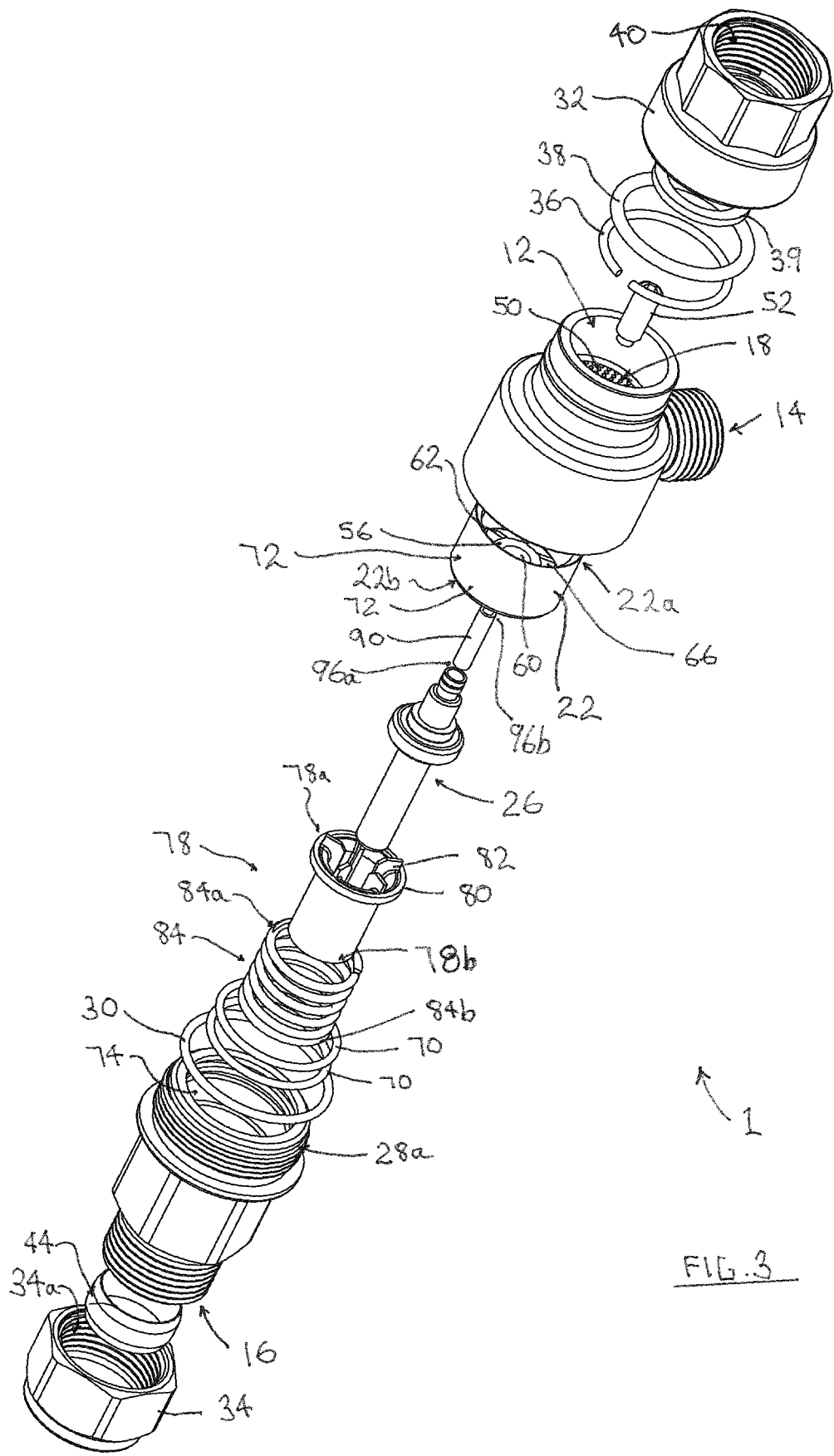
FIG. 3 is an exploded perspective view of the temperature control device shown in FIG. 1.

In FIGS. 1, 2 and 3, there is shown a first embodiment of a temperature control device 1 comprising a body 10 having a first inlet 12 for hot water to enter the body 10 (i.e. a hot water inlet), a second inlet 14 for cold water to enter the body 10 (i.e. a cold water inlet), an outlet 16 for water to exit the body, a diffuser 18 to disrupt the flow of hot water after it enters the body via the first inlet 12, a chamber 20 to receive the hot water and the cold water, a piston 22 which is movable in the body 10 between a first position and a second position, a seat 24 in the body 10 against which the piston 22 seats in the first position and a temperature sensitive device 26.

The temperature control device 1 controls the temperature of the water that exits the outlet 16 by restricting its maximum temperature to a preset temperature level, as will be further described herein. The temperature control device 1 permits pre-installation adjustment of the preset temperature level.

The body 10 comprises two body parts 10a and 10b, respectively. The two body parts 10a and 10b are connected together. Providing the body 10 in two parts 10a and 10b facilitates the insertion of the interior components of the temperature control device 1 into the body 10 during manufacture of the temperature control device 1. Once the interior components are in place, the two body parts 10a and 10b are connected together. The two parts 10a and 10b are connected together by respective screw threads. The screw threaded connection of the two body parts 10a and 10b is identified by reference numeral 28 in FIGS. 1 and 2. The screw thread of the body part 10b is identified by reference numeral 28a in FIG. 3. A seal, such as an O-ring 30, is provided between the two body parts 10a and 10b. The seal prevents leakage of water from the connection of the body parts 10a and 10b.

A connector 32 is provided at the first inlet (12) end of the body 10 and a connector 34 is provided at the outlet (16) end of the body 10. The connector 32 is used to connect the temperature control device 1 with the hot water outlet of a hot water system and the connector 34 is used to connect the temperature control device 1 with a conduit, e.g. a tube, to deliver tempered water from the temperature control device 1.

The connector 32, shown in the drawings, is a loose nut type connector which is attached to the body part 10a via a circlip 36 with a seal, such as an O-ring 38, provided between the connector 32 and the body part 10a. This type of attachment using the circlip 36 allows the connector 32 and the body part 10a to rotate relative to one another. The connector 32 has a seal 39 and an internal screw thread 40 for connection to the outlet of a hot water system.

The connector 34, shown in the drawings, is a compression type connector which is attached to the body part 10b via a screw threaded connection, which is identified by reference numeral 42 in FIGS. 1 and 2. The screw thread of the connector 34 is identified by reference numeral 34a in FIG. 3. The connector 34 uses an olive 44 to connect with a tube that delivers tempered water from the temperature control device 1.

Whilst particular types of connectors 32 and 34 have been shown in the drawings, these are for exemplary purposes only. The connectors 32 and 34 may be of any suitable type to connect the temperature control device 1 with the hot water outlet of a hot water system and an outlet delivery tube or other conduit, respectively. The body parts 10a and 10b may be suitably modified to accommodate alternative types of connectors at the inlet 12 and outlet 16 ends. This also applies to the cold water inlet 14, which is shown to have a screw thread 45 as the means for its connection to a cold water delivery conduit, as will be further herein described.

The diffuser 18 is provided in the body 10. The diffuser 18 is fixed in position in the body 10, i.e. the diffuser is immovable in the body 10. The diffuser is provided in body part 10a of the body 10. The diffuser 18 is provided near, but spaced from, the hot water inlet 12. The diffuser 18 has an upstream side 46 and a downstream side 48. The upstream side 46 is nearest the hot water inlet 12. The downstream side 48 is nearest the seat 24. The diffuser 18 is located upstream of the seat 24. The diffuser 18 is spaced from the seat 24 in the direction of the axial line extending through the temperature control device 1 from the first inlet 12 to the outlet 16. The diffuser 18 is located upstream of the cold water inlet 14.

In use, the diffuser 18 disrupts, or breaks up, the flow of the hot water that entered the temperature control device 1 via the hot water inlet 12, i.e. the diffuser 18 disrupts, or breaks up, the flow of the hot water after it enters the body 10 via the hot water inlet 12. The hot water entering via the hot water inlet 12 comes from the hot water outlet of a hot water system, and is typically at mains water pressure. Consequently, the hot water entering via the hot water inlet 12 is a pressurised smooth continuous flow. The hot water flows from the hot water inlet 12 to the diffuser 18 without any change in the direction of flow of the hot water (i.e. the flow of the hot water is a smooth continuous flow without any change in the flow direction). However, passage of the hot water through the diffuser 18 (from the upstream side 46 to the downstream side 48 of the diffuser 18) disrupts the smooth continuous flow of the hot water. The hot water that emerges from the diffuser 18 on the downstream side 48 is no longer a smooth continuous flow; instead, the hot water is scattered and directed at different angles and directions as it emerges from the diffuser 18 on the downstream side 48 of the diffuser 18.

The particular diffuser of the temperature control device 1 may be of any suitable form so as to disrupt the flow of the hot water.

The diffuser 18 shown in the drawings is provided substantially in the form of a disc, or plate, having openings 50 therethrough. The diffuser 18 has a central opening. The diffuser 18 is substantially annular due to the central opening. The openings 50 extend from the upstream side 46 to the downstream side 48 of the diffuser 18. The openings 50 are provided as an arrangement of multiple openings through the diffuser 18.

The temperature control device 1 further comprises a temperature setting mechanism. The temperature setting mechanism permits adjustment of (i.e. can be used to adjust and thereby set) the preset temperature level (i.e. preset level of temperature) of the temperature control device 1.

The temperature setting mechanism is operatively associated with the temperature sensitive device 26.

The temperature setting mechanism of the temperature control device 1 comprises a screw-like movable pin member, also referred to herein as an adjustment screw 52. The adjustment screw 52 has a driver groove 52a at a first end nearest the hot water inlet 12. The adjustment screw 52 has a flat surface at its second end 52b. The second end 52b extends into the chamber 20.

The diffuser 18 accommodates the adjustment screw 52. The screw thread of the adjustment screw 52 engages with a screw thread provided on the central opening in the diffuser 18. The adjustment screw 52 is thereby screw threadedly engaged with the diffuser 18 in the central opening of the diffuser 18. The screw threaded engagement is identified by reference numeral 54 in FIGS. 1 and 2.

The adjustment screw 52 is used to set the maximum temperature of the tempered water that can be discharged from the outlet 16 to a preset temperature level. This is done by inserting the end of a suitable tool, e.g. a screw driver, into the hot water inlet 12 and engaging it with the driver groove 52a in the adjustment screw 52 and turning the screw in the appropriate direction, which causes the screw to move in a linear direction. Turning the adjustment screw 52 in a first direction will raise the maximum temperature setting, whilst turning the adjustment screw 52 in the opposite (second) direction will lower the maximum temperature setting. It is intended that the maximum temperature setting, i.e. the preset temperature setting of the temperature control device 1 is a factory setting and is set at the time of manufacture of the temperature control device 1.

The chamber 20 is located on the downstream side 48 of the diffuser 18. Since the diffuser 18 is spaced from the seat 24, in the direction of the axial line extending through the temperature control device 1, there is a portion of the chamber 20 upstream of the seat 24, i.e. the chamber 20 commences immediately after the diffuser 18 and a portion of the chamber 20 is positioned upstream of the seat 24. This portion of the chamber 20 is identified by reference numeral 21 in the drawings. It is also referred to herein as the upstream chamber portion. The hot water that emerges from the diffuser 18 is received in the chamber 20. In particular, the hot water emerges from the diffuser 18 and is initially received into the chamber portion 21 of the chamber 20. Cold water that enters the body 10, via the cold water inlet 14, is also received in the chamber 20. The cold water inlet 14 is positioned at substantially at a right angle)(90° to the hot water inlet 12.

The piston 22 is substantially in the form of a short cylinder. The piston 22 has a first end 22a and a second end 22b. The first and second ends 22a and 22b are open, i.e. there is a respective opening at the first end 22a and the second end 22b. Thus, water is able to freely flow through the piston 22. A support 56 is provided inside the piston 20. The support 56 comprises a central hub 58 and struts 62. The hub 58 has an opening 60. The struts 62 extend radially from the hub 58 to the inside surface 64 of the piston 22. Openings 66 are formed between the struts 62 for passage of water.

A portion of the temperature sensitive device 26 extends through the piston 22. The support 56 supports the temperature sensitive device 26 in the piston 22. The piston 22 and temperature sensitive device 26 are connected. The piston 22 and temperature sensitive device 26 are connected at the hub 58 of the support 56. The temperature sensitive device 26 extends through the opening 60 in hub 58. The connection of the piston and temperature sensitive device 26, for example, may be by way of a screw threaded connection, adhesive, or other suitable means. The connection is identified by reference numeral 68 in FIGS. 1 and 2.

One or more seals, such as O-rings 70, is/are provided between the outside surface 72 of the piston 22 and the inside surface 74 of the body part 10b. The O-ring/s 70 may be provided in grooves in the inside surface 74 of the body part 10b.

The seat 24 is provided as an annular surface of the wall 76 of the body part 10a inside the body 10. The piston 22 and the seat 24 are provided in the chamber 20. The piston 22 and the seat 24 are located downstream of the diffuser 18.

A retainer 78 is provided for the temperature sensitive device 26 to retain the temperature sensitive device 26 in position inside the body 10. The retainer 78 is of substantially cylindrical form. The retainer 78 has a first end 78a and a second end 78b. The first and second ends 78a and 78b are open, such that water is able to travel through the retainer 78. The retainer 78 has an outwardly turned flange 80 at the first end 78a. The retainer 78 is provided with supports 82 to support the temperature sensitive device 26. The supports 82 are substantially in the form of ribs attached to the retainer 78 at the first end 78a and extend in the longitudinal direction of the retainer 78, inside the retainer 78.

A spring 84 is provided around the retainer 78. The spring 84 has a first end 84a and a second end 84b. The first end 84a abuts the outwardly turned flange 80. The second end 84b abuts an annular surface 85a of the wall 85b of the body part 10b inside the body 10.

A first flow-way for water is formed by the space between the retainer 78 and the surrounding internal surface of the wall 85b of the body part 10b. A second flow-way for water is formed by the space between the retainer 78 and the temperature sensitive device 26.

The temperature sensitive device 26 is responsive to changes in its ambient temperature. In use, this ambient temperature is the temperature of the water in the body 10, of the temperature control device 1, that surrounds the temperature sensitive device 26, as the water passes by the temperature sensitive device 26 through the second flowway.

The temperature sensitive device 26 may be a standard off-the-shelf unit. The temperature sensitive device 26 is of a type that has a temperature sensitive material 86, e.g. wax, that is able to expand and contract is response to changes in the ambient temperature of the temperature sensitive device 26.

The temperature sensitive device 26 comprises a casing 88. The temperature sensitive material 86 is contained in a first section of the casing 88 and a pin 90 is contained in a second section of the casing 88. A portion of the casing 88 is received in and extends through the opening 60 in the hub 58 of the support 56 in the piston 22. It is this portion of the casing 88 of the temperature sensitive device 26 that is connected to the piston 22 (at the hub 58 of the support 56), as herein before described. A portion 92 of the pin 90 extends from the casing 88. The pin 90 is movable relative to the casing 88, in first and second directions. The pin 90 is movable in a linear manner. A membrane 94 separates the first and second sections of the casing 88. The casing 88 is substantially rigid and able to conduct heat. The membrane 94 is flexible and resilient. Temperature sensitive devices of this type are pre-calibrated for distance of movement of the pin 90 versus each degree of temperature change within a particular temperature range, e.g. for each degree of change in the temperature within a particular temperature range (T1-T2), the temperature sensitive material 86 expands/contracts to move the pin 90 a specific distance. The temperature sensitive device 26 is selected such that it is responsive to temperature changes in the temperature range of the water where it will be used.

The adjustment screw 52 is operatively associated with the temperature sensitive device 26. As herein before described, turning the adjustment screw 52 in a first direction will result in the maximum temperature setting (i.e. the preset temperature level) being raised, whilst turning the adjustment screw 52 in the opposite (second) direction will result in the maximum temperature setting lowered. In that regard, turning the adjustment screw 52 will result in the end 52*b* of the adjustment screw 52 moving further into or out of the chamber 20, i.e. the end 52*b* of the adjustment screw 52 will move closer to or away from the second end 96*b* of the pin 90. Consequently, in use, the pin 90 will be able move a greater or lesser amount toward the adjustment screw 52 before it abuts the end 52*b* of the adjustment screw 52. In particular, turning the adjustment screw 52 in the first direction causes the adjustment screw 52 to move further into the chamber 20 toward the second end 96*b* of the pin 90 resulting in the preset temperature level being raised. This is because the maximum possible spacing between the end 22*a* of the piston 22 and the seat 24 is decreased. This decreased spacing means that less cold water can flow past the seat 24 into the chamber 20. Conversely, turning the adjustment screw 52 in the second direction causes the adjustment screw 52 to move further out of the chamber 20 away from the second end 96*b* of the pin 90 resulting in the preset temperature level being lowered. This is because the maximum possible spacing between the end 22*a* of the piston 22 and the seat 24 is increased. This increased spacing means that more cold water can flow past the seat 24 into the chamber 20.

In use, expansion of the temperature sensitive material 86 results in the temperature sensitive material 86 bearing against the membrane 94 which, in turn, bears against the end 96*a* of the pin 90 in the casing 88. This results in the pin 90 moving further out of the casing 88, as will be further described herein. The other end 96*b* of the pin 90 is located outside the casing 88, on the portion 92 of the pin 90.

The use and operation of the temperature control device 1 will now be described.

The temperature control device 1 is connected to a hot water system. In the normal course of use, the preset temperature level of the temperature control device 1 would have been factory set prior to the temperature control device being connected to the hot water system.

Figure 4:
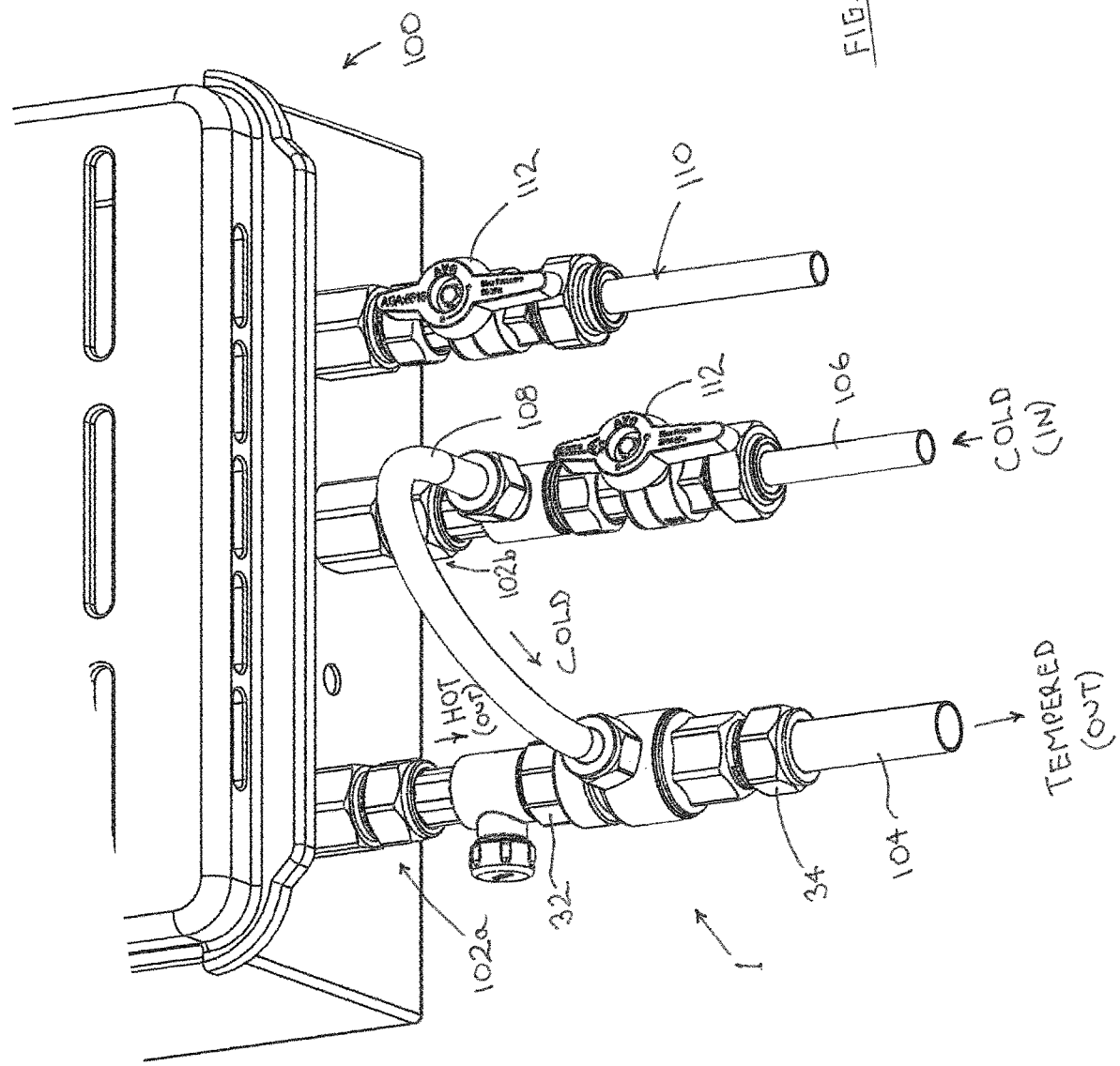
FIG. 4 shows the temperature control device, shown in FIG. 1, connected with a hot water system in a first installation.
Figure 5:
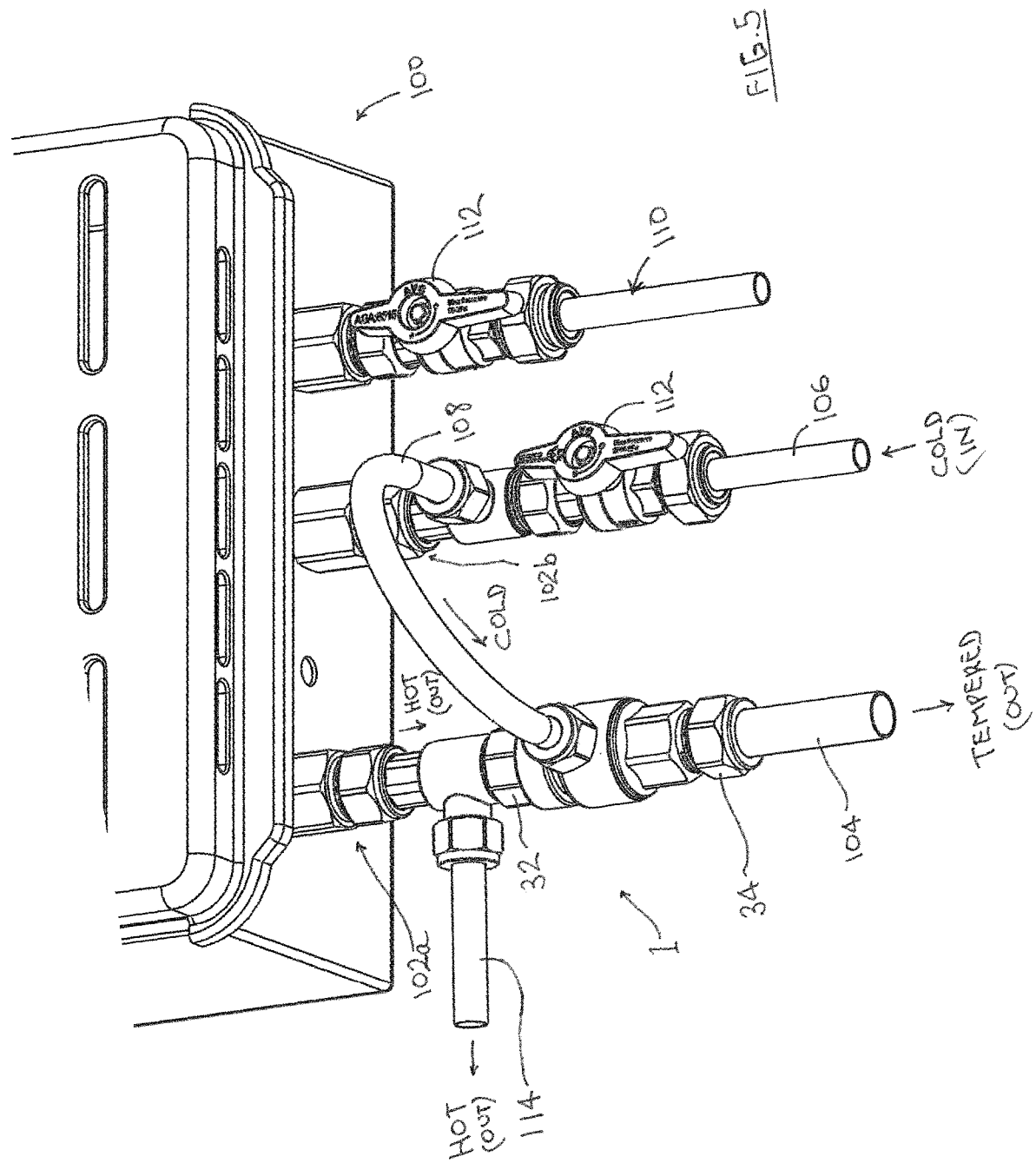
FIG. 5 shows the temperature control device, shown in FIG. 1, connected with a hot water system in a second installation.
Figure 6:
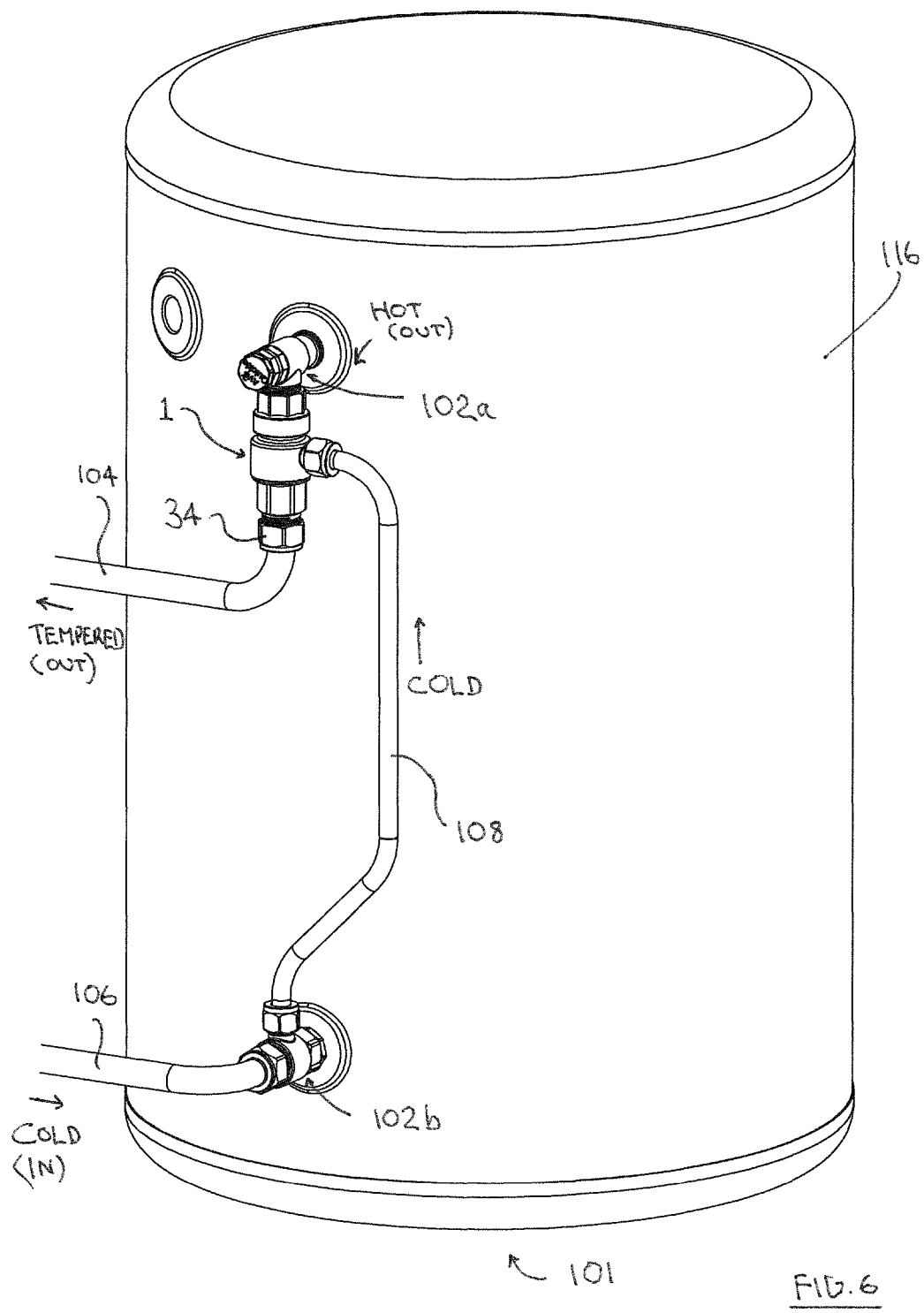
FIG. 6 shows the temperature control device, shown in FIG. 1, connected with a hot water system in a third installation.

FIGS. 4, 5 and 6 show three exemplary installations of the temperature control device 1 in a hot water system. The arrows show the direction of flow of water. The hot water system supplies heated water to water outlets at various locations in a building. These water outlets are typically controlled by a user operating a tap or faucet.

FIGS. 4 and 5 show installations of the temperature control device 1 in a hot water system 100 that has an instantaneous gas heater to heat the water. The temperature control device 1 is connected to the hot water outlet 102*a* of the hot water system 100 via the connector 32 (directly or with one or more intermediate connectors). This places the hot water outlet 102*a* of the hot water system 100 in fluid communication with the hot water inlet 12 of the temperature control device 1. The temperature control device 1 is connected to the delivery conduit, e.g. delivery tube 104, via the connector 34 (directly or with one or more intermediate connectors). This places the outlet 16 of the temperature control device 1 in fluid communication with the delivery tube 104. The delivery tube 104 delivers water from the temperature control device 1 to the water outlets at the various locations.

Cold water is delivered to the hot water system 100 via a cold water delivery conduit, e.g. cold water delivery tube 106. The cold water delivery tube 106 is in fluid communication with the cold water inlet 102*b* of the hot water system 100. A bypass conduit, e.g. flexible bypass tube 108, connects the cold water delivery tube 106 with the cold water inlet 14 of the temperature control device 1. This places the cold water inlet 14 of the temperature control device 1 in fluid communication with the cold water delivery tube 106 such that cold water can be delivered to the temperature control device 1 before it is delivered to the hot water system 100. Gas is delivered to the hot water system 100 via a gas delivery conduit, e.g. gas delivery tube 110. A respective isolation valve 112 may be provided in the cold water delivery tube 106 and the gas delivery tube 110 to turn off supply of cold water and/or gas to the hot water system 100 if required, e.g. for maintenance or repair tasks.

The difference between the installations shown in FIGS. 4 and 5 is that in the installation shown in FIG. 5, a hot water delivery conduit, e.g. hot water delivery tube 114, is provided. The hot water delivery tube 114 is provided such that it is in fluid communication with the hot water outlet 102*a* of the hot water system 100. The hot water delivery tube 114 is in fluid communication with the hot water outlet 102*a* from a location upstream of the hot water inlet 12 of the temperature control device 1. Hot water can be delivered via the hot water delivery tube 114 to any locations that require hot water, rather than the tempered water that is delivered via the delivery tube 104.

FIG. 6 shows an installation of the temperature control device 1 in a hot water system 101 that has a storage tank 116 in which heated water is stored. For example, an electric or gas heater may be located in the storage tank 116, which may be supplemented by a solar heater external of the storage tank 116. The temperature control device 1 is connected to the hot water outlet 102a of the hot water system 101 via the connector 32 (directly or with one or more intermediate connectors) and to the delivery conduit, e.g. delivery tube 104, via the connector 34 (directly or with one or more intermediate connectors), as herein before described with reference to FIGS. 4 and 5 and the hot water system 100. As a further exemplary installation (not shown in FIG. 6), a hot water delivery tube 114, as used in the installation shown in FIG. 5, may be used with an installation of the type shown in FIG. 6 so that hot water can be delivered via the hot water delivery tube 114 to any locations that require hot water, rather than the tempered water that is delivered via the delivery tube 104.

Once installed, in use, the temperature control device 1 operates to deliver tempered water, via the delivery tube 104, to outlets at locations that are connected to the delivery tube 104, as will be now described.

The non-operational condition of the temperature control device 1 is shown in FIG. 1. The non-operational condition of the temperature control device 1 is when no water is passing through the temperature control device 1 to exit from the outlet 16. In this condition, the piston 22 seats on the seat 24. This is the first position of the piston 22. The spring 84 biases the piston 22 to the first position. When the piston 22 seats on the seat 24, the first end 22a of the piston 22 is in contact with the seat 24. This prevents water from the second inlet 14 passing beyond the piston 22, i.e. cold water cannot pass from the cold water inlet 14 into the chamber 20 of the temperature control device 1 in the first position of the piston 22. This first position of the piston 22 is the closed condition of the temperature control device 1. In this closed condition of the temperature control device 1, when the piston 22 seats on the seat 24, the cold water inlet 14 is not in fluid communication with the chamber 20 in the interior of the body 10. In addition, in this non-operational condition of the temperature control device 1, the pin 90 is spaced from the screw 52. However, since the piston 22 has openings at its ends 22a and 22b and openings 66 are provided between the struts 62 in the piston 22 and since the hot water inlet 12 is in fluid communication with the chamber 20 via the openings 50 in the diffuser 18, even when the piston 22 seats on the seat 24 the hot water inlet 12 is in fluid communication with the chamber 20 in the interior of the body 10. The seat 24 is a cold water seat. That is, cold water is able to pass the seat 24 from the cold water inlet 14, when the piston 22 is spaced from the seat 24. However, temperature control device 1 does not have a hot water seat. Consequently, the hot water inlet 12 is always in fluid communication with the chamber 20, even when the piston 22 seats on the seat 24.

When a water outlet is opened at a location in the building (e.g. a tap or faucet in a bathroom) that is connected to the delivery tube 104 (e.g. a hot water outlet), mains water pressure acting on the hot water in the hot water system 100/101 forces hot water from the hot water system 100/101 to start to flow into the temperature control device 1. The hot water flows through the hot water inlet 12, passes through the diffuser 18, then into the chamber 20, then through the piston 22 and past the temperature sensitive device 26 to the outlet 16. As the hot water passes the temperature sensitive device 26, the hot water causes the temperature sensitive material 86, in the temperature sensitive device 26, to begin to expand. Expansion of the temperature sensitive material 86 causes the pin 90 to begin to move in the direction toward the screw 52. As the pin 90 moves in the direction toward the screw 52, the point is reached where the second end 96b of the pin 90 abuts against the screw 52 (as shown in FIG. 2).

At this point, the piston 22 begins to move away from the seat 24, creating a gap between the end 22a of the piston 22 and the seat 24. Once the piston 22 has moved away from the seat 24, cold water from the cold water delivery tube 106 and the bypass tube 108 starts to flow into the temperature control device 1 via the cold water inlet 14 and passes into the chamber 20.

As herein before described, the diffuser 18 disrupts the flow of the hot water that entered the temperature control device 1 via the hot water inlet 12 and, due to this disruption, the hot water that emerges from the diffuser 18 on the downstream side 48 is scattered and directed at different angles as it emerges from the diffuser 18.

The cold water entering via the cold water inlet 14 typically is at mains water pressure. Consequently, the cold water entering via the cold water inlet 14 is a pressurised smooth continuous flow.

The cold water from the cold water inlet 14 flows into the chamber 20 from a direction that is different from that of the hot water entering the chamber 20. The cold water enters the chamber 20 at substantially 90° to the axial direction through the temperature control device 1 from the first inlet 12 to the outlet 16.

The cold water flowing into the chamber 20, from the cold water inlet 14, and the disrupted hot water that passes through the diffuser 18 into the portion 21 of the chamber 20 are melded together resulting in tempered water. The tempered water has a temperature lower than the temperature of the hot water entering via the hot water inlet 12 and higher than the temperature of the cold water entering via the cold water inlet 14.

The tempered water is able to pass through the piston 22, which is located in the chamber 20, through the first flow-way and through the second flow-ways past the temperature sensitive device 26, and out through the outlet 16 into the delivery tube 104. The delivery tube 104 delivers the tempered water to the water outlet in the building that was opened.

The hot water inlet 12 and the outlet 16 are axially aligned, relative to the axial line extending through the body 10. Consequently, the directional flow of the hot water into and through the temperature control device 1 is in substantially a straight line, i.e. linear, from the hot water inlet 12 to the outlet 16. In contrast, the directional flow of the cold water (which enters via the cold water inlet 14) deviates at substantially 90° to the axial direction through the temperature control device 1 after it enters the chamber 20 in the body 10 and is melded with the hot water to form tempered water, which flows to the outlet 16.

The temperature sensitive device 26 continues to respond to the temperature of the tempered water as it travels past it. The temperature sensitive material 86, in the temperature sensitive device 26, continues to expand in response to the temperature of the tempered water, with the second end 96b of the pin 90 still abutting and pushing against the screw 52. The pin 90 can move no further, as it is stopped by the screw 52; in this way the screw 52 acts as a stop member or travel limiting member for the pin 90. Since the pin 90 can move no further, as it is stopped by the screw 52, the temperature sensitive device 26 and the piston 22, which is attached to it, move further away from the screw 52 against the biasing action of the spring 84. This movement away from the screw 52 further opens the gap between the end 22a of the piston 22 and the seat 24, which allows more cold water to enter the chamber 20. This continues until the point at which the maximum temperature setting, i.e. the preset temperature level, of the temperature control device 1 has been reached.

At this point, the piston 22 will not move any further away from the seat 24. This signifies the second position of the piston 22, at which the piston 22 is spaced from the seat 24 by the maximum spacing (which occurs when the preset temperature level has been reached). Whilst the piston 22 begins to be spaced from the seat 24 at the point at which it begins to move away from the seat 24, the maximum distance by which it is spaced from the seat 24 is at the second position of the piston 22. The second position of the piston 22 also signifies the fully open condition of the temperature control device 1. The fully open condition of the temperature control device 1 signifies that the pre-set temperature level of the temperature control device 1 has been reached, i.e. the maximum temperature of the tempered water that can exit from the outlet 16 has been reached. This means that the temperature of the tempered water exiting from the outlet 16 will not increase beyond the temperature that corresponds to the maximum temperature setting (i.e. the pre-set temperature level) of the temperature sensitive device 26.

When the water outlet (that was opened) is closed, the flow of hot water into the hot water inlet 12 and the flow of cold water into the cold water inlet 14 will stop, and the piston 22 will return to the seated position on the seat 24 under the biasing action of the spring 84. Tempered water will no longer be discharged from the outlet 16 and will not travel past the temperature sensitive device 26. The water remaining in the temperature control device 1 and surrounding the temperature sensitive device 26 will gradually cool. As the temperature of the water surrounding the temperature sensitive device 26 falls, the temperature sensitive material 86 contracts and the pin 90 moves away from the screw 52 and eventually returns to its position shown in FIG. 1. As herein before described, the maximum temperature setting is set at the time of manufacture of the temperature control device 1, using the adjustment screw.

Figure 7:
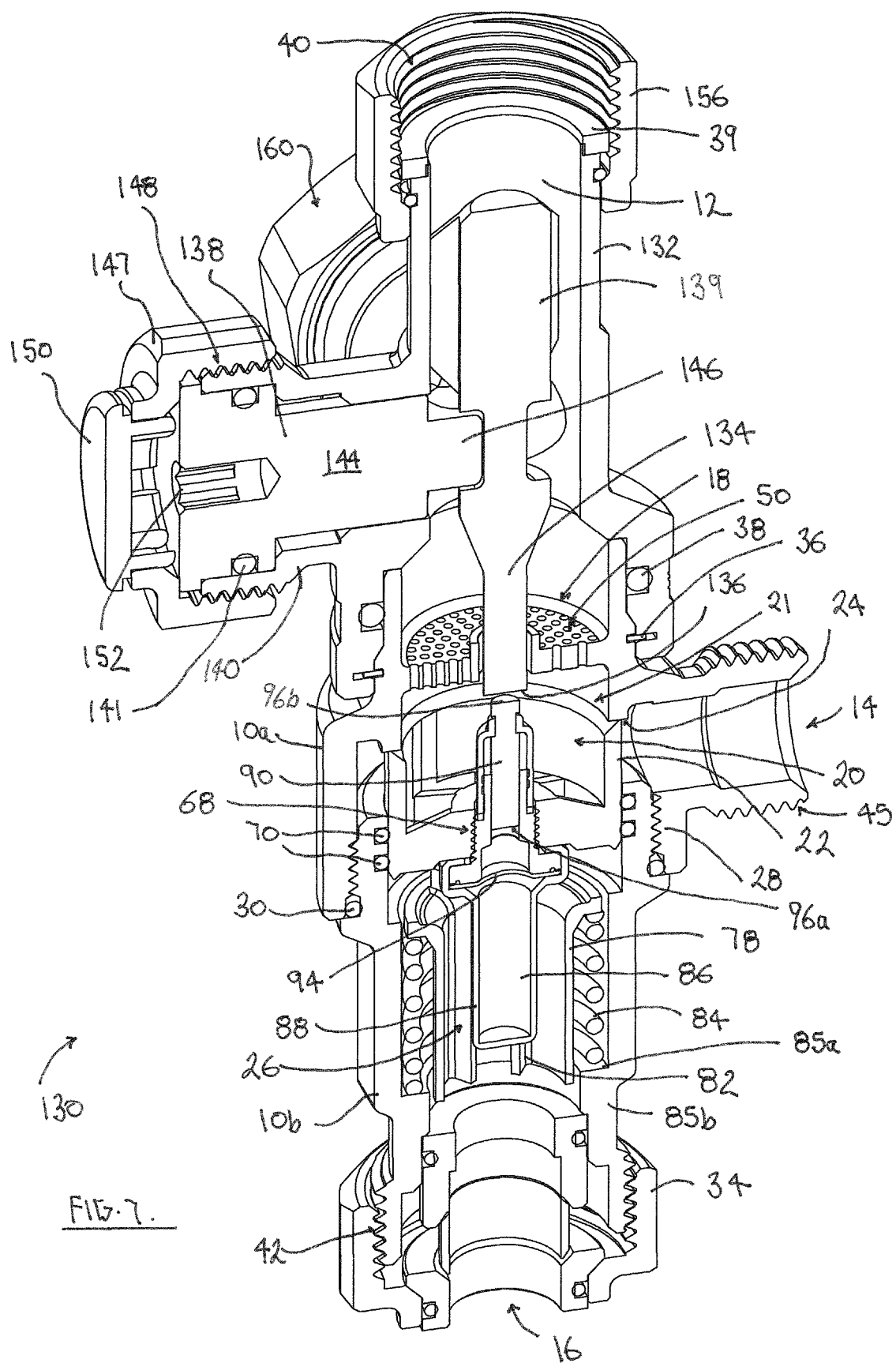
FIG. 7 is a 3-dimensional cut away view of a second embodiment of a temperature control device in accordance with an aspect of the present invention.
Figure 8:
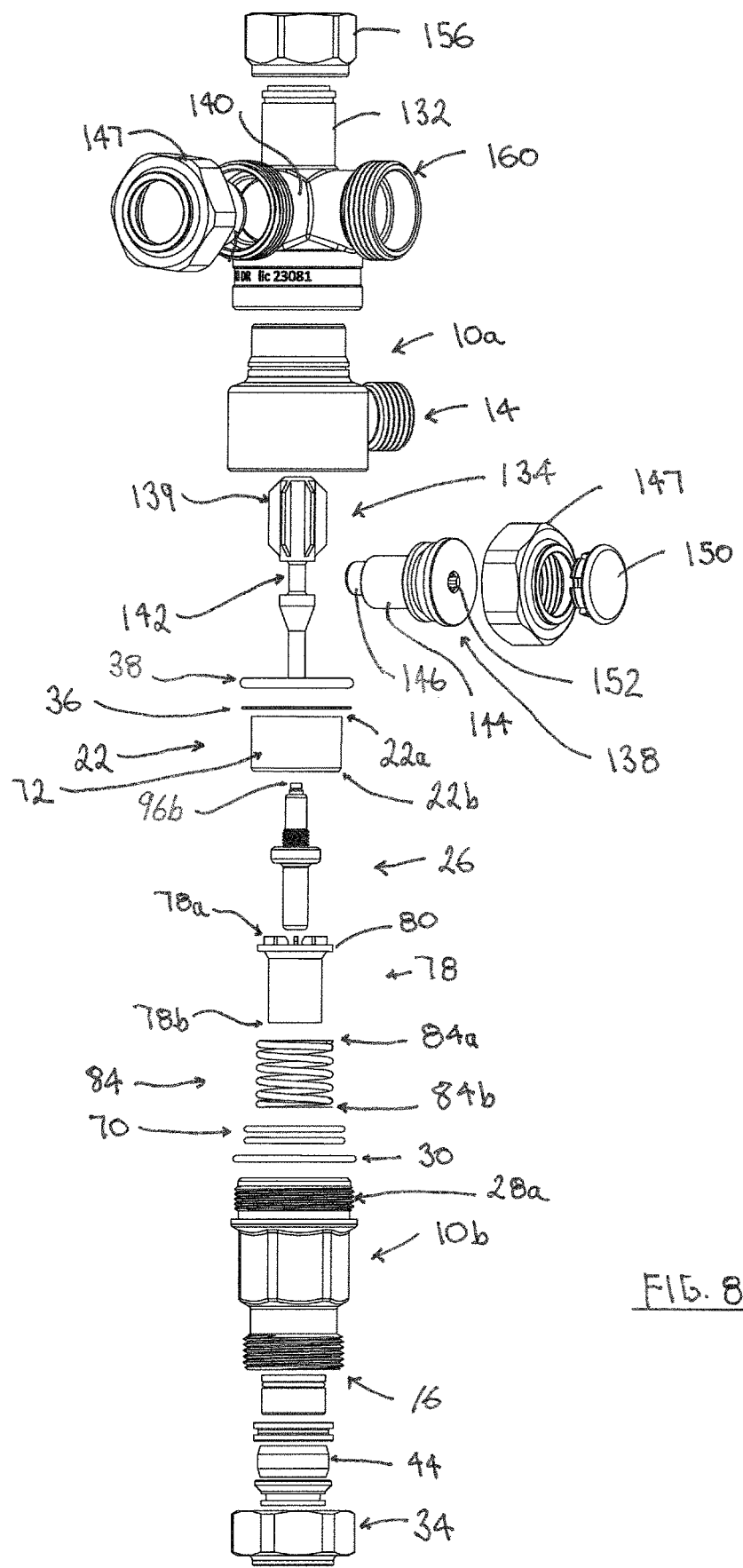
FIG. 8 is an exploded perspective view of the temperature control device shown in FIG. 7.

In FIGS. 7 and 8, there is shown a second embodiment of a temperature control device 2.

The temperature control device 2 of the second embodiment is similar to the temperature control device 1 of the first embodiment and consequently the following description of the temperature control device 2 will be directed primarily to the differences between the temperature control device 2 of the second embodiment and temperature control device 1 of the first embodiment.

The temperature setting mechanism of the temperature control device 2 is different from the temperature setting mechanism of the temperature control device 1. This is the main difference between the first and second embodiments of the temperature control device.

The temperature setting mechanism of the temperature control device 2 comprises a movable pin member 134 and an actuator 138, as will be further herein described. The movable pin member 134 has an end 136. The end 136 extends into the chamber 20. The end 136 of the movable pin member 134 is the counterpart of the second end 52b of the adjustment screw 52 of the temperature control device 1 of the first embodiment.

The body of the temperature control device 2 is designated by reference numeral 130 and comprises three body parts 10a, 10b and 132. The body parts 10a and 10b are the same as the body parts 10a and 10b of the temperature control device 1 of the first embodiment. The body part 132 is connected to the body part 10a in a similar manner to the way in which the connector 32 is connected to the body part 10a of the temperature control device 1, namely with a circlip 36 with a seal, such as an O-ring 38, provided between the connector 32 and the body part 10a. This type of attachment using the circlip 36 allows the body part 132 and the body part 10a to rotate relative to one another.

The movable pin member 134 is positioned in the body 130. In particular, the movable pin member 134 is positioned in the body part 132. The pin member 134 is provided with guide fins 139 to support the movable pin member 134 in the body 130.

The body part 132 is provided with a first offset portion 140. The actuator 138 is positioned in the offset portion 140. A seal, such as an O-ring, 141 is provided between the actuator 138 and the inside surface of the offset portion 140. The actuator 138 is rotatable, i.e. rotatably positioned, in the first offset portion 140. The movable pin member 134 has a groove 142. The groove 142 extends around the movable pin member 134. The actuator 138 comprises a main body portion 144. The main body portion 144 is substantially cylindrical. A projection 146 extends from a first end of the main body portion 144. The projection 146 is axially offset relative to the main body portion 144 of the actuator. Thus, the projection 146 extends from the main body portion 144 such that it is not coaxial (i.e. non-coaxial) with the main body portion 144. The projection 146 engages in the groove 142 in the movable pin member 134. Since the projection 146 and the main body portion 144 are non-coaxial, upon rotation, i.e. turning, of the actuator 138 the engagement of the projection 146 will cause the movable pin member 134 to move in a linear direction. The linear direction in which the movable pin member 134 moves will be further into or out of the chamber 20, i.e. the end 136 of the movable pin member 134 will move closer to or away from the second end 96b of the pin 90, depending upon the direction in which the actuator 138 is turned.

The diffuser 18 accommodates the movable pin member 134. The slidable pin member 134 is able to slide in the central opening in the diffuser 18.

A nut 147 is screw threadedly engaged with the offset portion 140, as shown by reference numeral 148 in FIG. 7, to retain the actuator 138 in the offset portion 140. A removable cover 150 is attached to the end of the offset portion 140 to cover the second end of the actuator 138.

The second end of the main body portion 144 of the actuator 138 is provided with a recess 152. After removing the cover 150, suitable tool, e.g. a hex tool, can be inserted into the recess 152 to rotate, or turn, the actuator 138.

Rotating the actuator 138 adjusts the maximum temperature of the tempered water that can be discharged from the outlet 16. This is the preset temperature level of the temperature control device 2. Turning the actuator 138 in a first direction will raise the maximum temperature setting, whilst turning the actuator 138 in the opposite (second) direction will lower the maximum temperature setting, i.e. the preset temperature level. Since the removable cover 150 can be removed and replaced, the actuator 138 is accessible both prior to and after installation of the temperature control device 2. Consequently, the maximum temperature setting, i.e. the preset temperature level, of the temperature control device 2, can be adjusted using the actuator 138 and movable pin member 134 whenever required (i.e. both pre-installation and post-installation) to thereby set the preset temperature level of the temperature control device 2. In the post-installation adjustment, it is not necessary to disassemble the temperature control device 2 from the plumbing installation, e.g. hot water system, in which the temperature control device 2 is installed.

The movable pin member 134 is operatively associated with the temperature sensitive device 26 in a manner similar to that herein before described with reference to the adjustment screw 52 of the temperature control device 1 of the first embodiment. In that regard, turning the actuator 138 will result in the end 136 movable pin member 134 moving further into or out of the chamber 20, i.e. the end 136 of the movable pin member 134 will move closer to or away from the second end 96b of the pin 90. Consequently, in use, the pin 90 will be able move a greater or lesser amount toward the movable pin member 134 before it abuts the end 136 of the movable pin member 134. In particular, turning the actuator 138 in the direction to cause the movable pin member 134 to move further into the chamber 20 toward the second end 96b of the pin 90 results in the preset temperature level being raised. Conversely, turning the actuator 138 in the direction to cause the movable member 134 to move further out of the chamber 20 away from the second end 96b of the pin 90 results in the preset temperature level being lowered. This is further described with reference to the temperature setting mechanism of the temperature control device 1 of the first embodiment.

A connector 156 is provided at the first inlet (12) end of the body 130. The connector 156 is a counterpart to the connector 32 of the temperature control device 1 of the first embodiment. The connector 156 is used to connect the temperature control device 2 with the hot water outlet of a hot water system. The connector 156, shown in the drawings, is a loose nut type connector. A seal, such as an O-ring, 156 is provided between the connector 156 and the body part 132. The connector 156 has a seal 39 and an internal screw thread 40 for connection to the outlet of a hot water system.

The temperature control device 1 may be modified to use the connector 156. Similarly, the temperature control device 2 may be modified to use the connector 32.

The body 130 of the temperature control device 2 may be provided with another offset portion 160. The body part 132 is provided with the offset portion 160. The offset portion 160 is in fluid communication with the hot water inlet 12 of the temperature control device 2. The offset portion 160 may be connected to a hot water delivery tube 114, as described with reference to the installation shown in FIG. 5, to deliver hot (i.e. untempered) water via the hot water delivery tube 114 to any locations that require hot water, rather than the tempered water that is delivered via the delivery tube 104.

The temperature control device 2 may be modified to not have an offset portion 160 and instead have an arrangement as shown in FIG. 5 to deliver hot water. Similarly, the temperature control device may be modified to have an offset portion 160 to deliver hot water.

In other respects, the parts of the temperature control device 2 and their use and operation are the same as or analogous to the description of the temperature control device 1 of the first embodiment.

FIG. 9 shows an exemplary installation of the temperature control device 2 in a hot water system. The installation shown in FIG. 9 is similar to the installation shown in FIG. 5, as both of these installations have a hot water delivery conduit, e.g. hot water delivery tube 114. In the installation shown in FIG. 9, a hot water delivery tube 114 is connected to the offset portion 160. In the installation shown in FIG. 9, the flexible bypass tube 108 of the installations shown in FIGS. 4 and 5, is replaced by a telescopic rigid (metal) conduit 162. As alternatives, the installations shown in FIGS. 4 and 5 may use a telescopic rigid conduit 162, and the installation shown in FIG. 9 may use a flexible bypass tube 108. However, regulatory requirements may necessitate the use of a rigid metal conduit 162 in external situations.

In other respects, the installation shown in FIG. 9 and its use and operation are similar to the installation shown in FIG. 5.

The temperature control device may also be used in a hot water system 101 that has a storage tank 116 in which heated water is stored, similar to the installation shown in FIG. 6 although a hot water delivery conduit would also be provided.

It is also to be understood that the temperature control device 2 may be modified to omit the offset portion 160. In this modified embodiment, the installation and operation would be similar to the installations shown in FIGS. 4 and 6.

The temperature control device of the present invention provides energy savings since a user does not need to manually adjust separate hot and cold water taps or faucets to reach the required tempered water temperature at the tap/faucet outlet. The temperature control device of the present invention has a preset temperature level so that the temperature of the tempered water that is delivered is always at the desired temperature, in accordance with the preset temperature level.

The individual features of each aspect or embodiment disclosed herein may each be combined with any or all features of the other aspects or embodiments disclosed herein. Furthermore, the particular features, structures or characteristics may be combined as suitable in one or more aspects or embodiments of the disclosure.

Whilst one or more preferred embodiments of the present invention have been herein before described, the scope of the present invention is not limited to those specific embodiment(s), and may be embodied in other ways, as will be apparent to a person skilled in the art.

Modification and variations such as would be apparent to a person skilled in the art are deemed to be within the scope of the present invention.

What is claimed is:

1. Temperature control device comprising:
    a body having a first inlet for hot water, a second inlet for cold water and an outlet,
    a chamber to receive the hot water and the cold water,
    a diffuser in the form of a disc having a plurality of openings therethrough to disrupt the flow of hot water after it enters the body via the first inlet, the diffuser being disposed within a fluid flow path extending entirely between the chamber and the first inlet, the entire diffuser being upstream of the second inlet,
    a piston movable in the body between a first position and a second position,
    a seat in the body against which the piston seats in the first position and from which the piston is spaced in the second position, the cold water able to enter the chamber when the piston is spaced from the seat, and
    a temperature sensitive device responsive to changes in the ambient temperature,
    wherein, in use, the disrupted hot water and the cold water are melded together in the chamber resulting in tempered water which is discharged from the outlet, and wherein when the ambient temperature of the water around the temperature sensitive device increases to a preset temperature level, the piston is at the second position.

2. Temperature control device according to claim 1, wherein a portion of the chamber is located upstream of the seat such that, in use, hot water emerges from the diffuser into the portion of the chamber and cold water flows into the hot water emerging into the portion of the chamber and the hot water and cold water are melded together in the chamber resulting in tempered water.

3. Temperature control device according to claim 1, wherein the temperature sensitive device is provided with a pin and a temperature sensitive material that is able to expand and contract with changes in the ambient temperature, and
   wherein expansion of the temperature sensitive material causes the pin to move in a first or second direction.

4. Temperature control device according to claim 1, further comprising a temperature setting mechanism for adjustment of the preset temperature level.

5. Temperature control device according to claim 4, wherein the temperature setting mechanism is operatively associated with the temperature sensitive device.

6. Temperature control device according to claim 4, wherein the temperature setting mechanism includes a movable pin member that is movable, in respective first and second directions, closer to or away from the movable pin of the temperature sensitive device to thereby adjust the preset temperature level.

7. Temperature control device according to claim 6, wherein the movable pin member is accommodated by the diffuser.

8. Temperature control device according to claim 7, wherein the movable pin member extends through a central opening in the diffuser.

9. Temperature control device according to claim 6, wherein the movable pin member has a screw thread that engages with a screw thread in the diffuser, such that turning the movable pin member moves the movable pin member in the first or second direction.

10. Temperature control device according to claim 6, wherein the temperature setting mechanism further includes an actuator that is engageable with the movable pin member, such that turning the actuator moves the movable pin member in the first or second direction.

11. Temperature control device according to claim 4, wherein the temperature setting mechanism permits adjustment of the preset temperature level prior to the temperature control device being installed in a plumbing installation, such as a hot water system.

12. Temperature control device according to claim 11, wherein the temperature setting mechanism is accessible from outside the temperature control device only when the temperature control device is not installed in a plumbing installation.

13. Temperature control device according to claim 11, wherein the temperature setting mechanism is accessible via the first inlet.

14. Temperature control device according to claim 4, wherein the temperature setting mechanism permits adjustment of the preset temperature level both prior to and after the temperature control device being installed in a plumbing installation, such as a hot water system.

15. Temperature control device according to claim 14, wherein the temperature setting mechanism is accessible from outside the temperature control device both when the temperature control device is not installed in a plumbing installation and when the temperature control device is installed in a plumbing installation.

16. Temperature control device according to claim 14, wherein the temperature setting mechanism is accessible via an offset portion of the body of the temperature control device.

17. A method of installing the temperature control device according to claim 1, in a hot water system comprising:
   connecting a hot water outlet of the hot water system with the first inlet of the temperature control device, such that the hot water outlet of the hot water system and the first inlet of the temperature control device are in fluid communication,
   connecting the outlet of the temperature control device with a delivery conduit for delivering water exiting from the outlet of the temperature control device to one or more locations, such that the outlet of the temperature control device is in fluid communication with the delivery conduit, and
   connecting the second inlet of the temperature control device with a cold water delivery conduit via a bypass conduit such that the second inlet of the temperature control device and the cold water delivery conduit are in fluid communication via the bypass conduit, the cold water delivery conduit arranged to deliver cold water to the hot water system to be heated.

18. A hot water system comprising:
   a water inlet,
   a water outlet,
   the temperature control device according to claim 1,
   the water inlet arranged to be connected in fluid communication with a first water delivery conduit to deliver water to the hot water system to be heated,
   the water outlet arranged to be connected in fluid communication with the first inlet of the temperature control device,
   the outlet of the temperature control device arranged to be connected in fluid communication with a second water delivery conduit for delivering water exiting from the outlet of the temperature control device to one or more locations, and
   a bypass conduit to place the second inlet of the temperature control device in fluid communication with the first water delivery conduit such that water from the first water delivery conduit is able to flow through the bypass conduit to the second inlet of the temperature control device.

19. Temperature control device comprising:
   a body having a first inlet for hot water, a second inlet for cold water and an outlet,
   a chamber to receive the hot water and the cold water,
   a diffuser in the form of a disc having a plurality of openings therethrough to disrupt the flow of hot water after it enters the body via the first inlet, the diffuser being disposed within a fluid flow path extending between the chamber and the first inlet, the entire diffuser being upstream of the second inlet,
   a piston movable in the body between a first position and a second position,
   a single seat in the body against which the piston seats in the first position and from which the piston is spaced in the second position, the cold water able to enter the chamber when the piston is spaced from the seat, wherein movement of the piston controls only the flow of cold water into the chamber but the flow of hot water into the chamber remains constant despite movement of the piston between the first position and the second position, and
   a temperature sensitive device responsive to changes in the ambient temperature,
   wherein, in use, the hot water and the cold water are melded together in the chamber resulting in tempered water which is discharged from the outlet, and wherein when the ambient temperature of the water around the temperature sensitive device increases to a preset temperature level, the piston is at the second position.

\* \* \* \* \*